United States Patent [19]

Kuder et al.

[11] Patent Number: 4,878,224

[45] Date of Patent: Oct. 31, 1989

[54] DYE LASERS

[75] Inventors: James E. Kuder, Fanwood; James L. McGinnis, Tewksbury Twp.; Harris A. Goldberg, Colonia; Timothy R. Hart, Hoboken; Tessie M. Che, Westfield, all of N.J.

[73] Assignee: Hoechst Celanese Corporation, Somerville, N.J.

[21] Appl. No.: 245,090

[22] Filed: Sep. 16, 1988

[51] Int. Cl.⁴ ................................................. H01S 3/22
[52] U.S. Cl. ......................................... 372/53; 372/20
[58] Field of Search ............................ 372/53, 54, 20; 423/338

[56] References Cited

U.S. PATENT DOCUMENTS 4,765,818  8/1988  Che et al. ............................ 423/338

Primary Examiner—Leon Scott, Jr.
Attorney, Agent, or Firm—DePaoli & O'Brien

[57] ABSTRACT

In one embodiment this invention provides a tunable laser device which is characterized by a dye laser medium which consists of a porous glass matrix containing an incorporated solution of a lasing dye, and which is adapted to operate continuously in combination with an optical pumping means.

24 Claims, No Drawings

DYE LASERS

BACKGROUND OF THE INVENTION

It is known that stimulated emission can be produced in various organic solutions. The first such solutions were of dyes, as reported by Sorokin et al, IBM Journal, Volume II, page 130, Mar. 1967, and since then devices which have been used to produce such stimulated radiation have been commonly known as "dye lasers". Some materials which fluoresce or scintillate outside the visible spectrum also have been utilized. A compilation of materials which have served as the active medium in dye lasers is provided in the above cited article of Sorokin et al, and in the review of Kagan et al, Laser Focus, page 26, Sept. 1968.

United States Patents which describe dye lasers include U.S. Pat. Nos. 3,541,470; 3,679,995; 3,684,979; 3,818,371; 4,397,023; 4,603,422; and references cited therein.

Of particular interest with respect to the present invention is J. Am. Chem. Soc., 88(24), 5956(1984) by D. Avnir et al, which reports the production of a monolithic matrix of silica gel glass which has a content of embedded Rhodamine 6G. The translational, rotational and vibrational degrees of freedom of the trapped dye are reduced.

The characteristics of dye lasers which make them attractive are the possibilities of wide spectral range and tunability at low cost. The laser can be operated anywhere in the visible or into the ultraviolet or infrared simply by changing to a solution which emits at the desired spectral output.

The output wavelength of a dye laser also is tunable, either by varying the concentration of the solution, by varying the solvent, or by introducing a wavelength selective element such as a grating reflector into the optical cavity to control the emission wavelength. Significant spectral narrowing without significant energy reduction is an additional benefit obtained with the use of a grating reflector i.e., line widths less than 1 angstrom can be achieved in contrast to the 50-200 angstrom widths which are characteristic dye laser emission.

Typical dye lasers have been pumped with Q-switched ruby or glass lasers, or pumping has been accomplished with flash lamps. Pumping has been either in a longitudinal geometry, in which the pumping radiation is colinear with the optical cavity axis and stimulated radiation, or in a transverse geometry, with the excitation at right angles to this axis.

Dye lasers have not achieved their full potential because of various disadvantages such as (1) a number of useful materials are difficult to pump because of low quantum efficiency or high excited state losses due to singlet-triplet transitions or to triplet absorptions; (2) low conversion efficiencies, high coupling energy losses, and low repetition rates result due to thermal effects induced during pumping; and (3) dye circulation problems and limitations are posed by these thermal effects.

Accordingly, it is an object of this invention to provide an improved tunable lasing system.

It is another object of this invention to provide a dye laser which has low excited state losses, and is characterized by a high quantum efficiency.

It is a further object of this invention to provide a dye laser medium which has a solid matrix phase and a static dye solution phase.

Other objects and advantages of the present invention shall become apparent from the accompanying description and examples.

DESCRIPTION OF THE INVENTION

One or more objects of the present invention are accomplished by the provision of a dye laser consisting of a composite composition of an inorganic oxide glass monolith with a microporous structure containing an incorporated solution comprising a solvent component and a lasable dye component, and wherein the glass monolith has sealed outer surfaces.

The glass monolith typically is comprised of silica either alone or in combination with up to about 20 weight percent of one or more other inorganic oxides of elements such as lithium, sodium, potassium, rubidium, cesium, magnesium, calcium, strontium, barium, titanium, zirconium, vanadium, tantalum, chromium, molybdenum, tungsten, manganese, iron, nickel, cobalt, copper, zinc, cadmium, boron, aluminum, phosphorus, gallium, germanium, tin, arsenic, antimony, bismuth, selenium, and the like.

The glass monolith microporous matrix nominally has a pore volume between about 10-80 percent, of the total volume, and has pore diameters in the range between about 15-2000 angstroms. The average pore diameter preferably is in the range between about 50-300 angstroms.

The glass monolith structure typically is in the form of a rod, with dimensions in the range between about 0.5-2 centimeters in diameter and 1-10 centimeters in length.

The incorporated dye solution can occupy between about 1-100 percent of the microporous volume of the glass monolith, and usually it occupies between about 80-100 percent of the microporous volume.

A present invention dye laser composite medium can be prepared by immersing a microporous inorganic oxide glass monolith in a volume of dye solution which is to be incorporated. The solution impregnates the microporous structure by capillary action.

Another aspect of composite composition preparation involves sealing the outer surfaces of the glass monolith matrix to prevent the migration or vaporization of any of the incorporated solution components out of the glass monolith surface micropores.

In one method a glass monolith containing the incorporated solution is sealed with a coating or film of a polymer, such as by dipping or spraying with an organic solution of the polymer. Suitable polymers for this purpose include poly(methyl methacrylate), polyvinyl acetate, polyvinyl chloride, polyurethane, polyethylene, epoxy resin, hydroxyethylcellulose, and the like.

Inorganic materials also can be utilized as a surface sealant, such as a transparent metal coating or a nonporous sol-gel coating.

In another embodiment this invention provides a tunable lasing system which comprises a laser cavity containing a laser dye medium, and an optical pumping excitation means operably coupled with the dye medium and capable of producing stimulated emission of the dye medium; wherein the dye medium consists of a composite composition of an inorganic oxide glass monolith with a microporous structure containing an incorporated solution comprising a solvent component and a lasable dye component, and wherein the glass monolith has sealed outer surfaces.

The tunable lasing system can be operated with a pulsed or continuous optical pumping mode.

The term "dye laser" as employed herein refers to a laser utilizing an allowed transition of conjugated $\pi$ electrons in organic molecules.

The term "solution" as employed herein refers to a solvent medium which is fluid at ambient temperatures, and which contains a dissolved organic component which exhibits lasing activity.

The term "sealed" as employed herein refers to the outer surfaces of a glass monolith which are nonporous with respect to the organic components of the solution which is incorporated in an invention dye laser composite medium. The sealant on the outer surface boundary can be an organic or inorganic coating or other substrate which effectively prevents the migration of solution components out of an invention composite composition.

The term "transparent" as employed herein refers to an optical medium which is transparent or light transmitting with respect to incident fundamental light frequencies and created light frequencies. In an invention dye laser device, the dye solution impregnated glass monolith structure is transparent to both the incident and exit light frequencies.

PREPARATION OF POROUS INORGANIC OXIDE GLASS MONOLITHS

The various methods for the manufacture of porous glass are reviewed in U.S. Pat. No. 4,528,010. The methods include the Vycor (Corning), chemical vapor deposition, white carbon, colloid silica, and silica gel procedures.

One method of producing a porous glass body involves (1) forming an article of desired shape from a parent borosilicate glass; (2) thermally treating the glass article at a temperature of 500°–600° C. to separate the glass into a silica-rich phase and a silica-poor phase; (3) dissolving or leaching the silica-poor phase with acid to provide a porous structure composed of the silica-rich phase; and (4) washing to remove leaching residue, and then drying.

Embodiments for production of porous inorganic oxide glass monoliths by leaching of a soluble phase from a solid glass structure are described in U.S. Pat. Nos. 2,106,744; 2,286,275; 2,303,756; 2,315,328; 2,480,672; 3,459,522; 3,843,341; 4,110,093; 4,112,032; 4,236,930; 4,588,540; and references cited therein; incorporated herein by references.

U.S. Pat. No. 4,584,280 describes a process for preparing a transparent porous ceramic film which involves applying an anhydrous solution containing an organometallic compound and a multifunctional organic compound to a substrate; and then thermally decomposing the organic compounds.

A more recent development is the "sol-gel" process for preparation of porous monolithic glasses and ceramics at moderate temperatures. The sol-gel procedure involves the formation of a three-dimensional network of metal oxide bonds at room temperature by a hydrolysis-condensation polymerization reaction of metal alkoxides, followed by low temperature dehydration. The resultant porous glass structure optionally can be sintered at elevated temperatures.

In another embodiment this invention provides a process for producing a dye laser composite composition comprising a homogeneous inorganic oxide glass monolith with a microporous structure containing an organic dye solution which exhibits lasing activity, which comprises (1) hydrolyzing tetraalkoxysilane under acidic or basic pH conditions in a sol-gel reaction medium comprising water and a water-miscible organic solvent component until gellation of the reaction medium is completed; (2) removing the solvent medium to provide a porous glass monolith; (3) impregnating the porous glass monolith with an organic dye solution which exhibits lasing activity under optical pumping excitation; and (4) sealing the glass monolith outer surfaces The term "homogeneous" as employed herein with reference to a porous glass monolith means that the inorganic oxide composition and the microstructure are substantially invariant throughout the monolith.

Embodiments for production of porous inorganic oxide glass monoliths by the sol-gel process are described in U.S. Pat. Nos. 3,640,093; 3,678,144; 3,681,113; 3,811,918; 3,816,163; 3,827,893; 3,941,719; 4,327,065; 4,389,233; 4,397,666; 4,426,216; 4,432,956; 4,472,510; 4,477,580; 4,528,010; 4,574,063; and references cited therein; incorporated herein by reference.

Illustrative of water-miscible solvents employed in a sol-gel process embodiment are alkanols such as methanol and ethanol; ketones such as acetone and methyl ethyl ketone; esters such as methyl acetate and ethyl formate; ethers such as dioxane and tetrahydrofuran; amides such as dimethylformamide, dimethylacetamide and 1-methyl-2-pyrrolidinone; and the like.

Acidic pH conditions in the sol-gel process can be provided by the addition of mineral acids such as hydrochloric acid; and basic pH conditions can be provided by the addition of bases such as ammonium hydroxide.

Illustrative of tetraalkoxysilanes and other metal and metalloid alkoxides are methoxy and ethoxy derivatives of silicon, lithium, magnesium, titanium, manganese, aluminum, tin, antimony, and the like. Aryloxy derivatives also can be utilized in the sol-gel process.

Particularly preferred sol-gel porous inorganic oxide glass monoliths for purposes of the present invention are those described in copending patent application Ser. No. 18,256, filed Feb. 24, 1987; incorporated herein by reference.

Porous glass monoliths produced by a preferred sol-gel process embodiment have an advantageous combination of properties, and generally have superior optical properties as compared to porous glass monoliths prepared by other techniques, e.g., by the leaching of a silica-poor phase from a borosilicate glass.

A sol-gel derived porous glass monolith is homogeneous, and the inorganic matrix can be obtained essentially free of inorganic or organic impurities, e.g., less than 2 weight percent of impurities.

A sol-gel derived porous glass monolith typically has a pore structure in which substantially all of the pores have diameters within about a 100 angstrom diameter variation range, e.g., within a range between about 50–150 or 300–400 or 900–1000 angstroms, as determined by sol-gel processing conditions.

A sol-gel derived porous glass monolith can have exceptional optical properties because the inorganic matrix is homogeneous in chemical composition and physical structure. Since there is minimized light scattering, the sol-gel derived porous glass monolith exhibits excellent optical transparency and light transmitting ability.

LASABLE DYE COMPONENT OF SOLUTION

The lasable dye component of the solution which is incorporated in a present invention dye laser composite medium typically is employed in a concentration between about $1 \times 10^{-2}$ and $1 \times 10^{-4}$ molar.

A compilation of over 500 lasing organic compounds is listed in "Laser Dyes" by M. Maeda, Academic Press Inc., New York (1984).

The list of dye compounds is classified in accordance with chemical structures, such as cyanine, xanthene, triarylmethane, acridine, azine, chlorophyll, polyphenylene, condensed aromatic rings, coumarin, oxazole, phthalimide, pteridine, and the like.

Dye lasers and the optical properties of various dye compounds are described in "Introduction to Lasers and Their Applications" by D. O'Shea et al, pages 167–176; Addison-Wesley Publishing Company, Reading, Mass. (1977).

In FIG. 6.29 on page 171 of the text, dye laser output curves of laser dyes are illustrated over a 4000–8000 angstrom wavelength range, when pumped with an argon ion laser. The output curves are for carbostyril 165; coumarin 120; coumarin 2; 7-diethylamino-4-methylcoumarin; coumarin 102; coumarin 7; coumarin 6; sodium fluorescein; rhodamine 110; rhodamine 6G; rhodamine B; cresyl violet perchlorate; and nile blue-A perchlorate.

SOLVENT COMPONENT OF THE SOLUTION

The solvent component of the dye solution incorporated in the microporous structure of the glass monolith is in a fluid state under operational conditions, e.g., 20°–30° C., and is selected to provide suitable solvating power with respect to the organic dye component which exhibits lasing response.

The solvent component can be a single solvent or a mixture of solvents. Suitable organic solvents include aliphatic, alicyclic and aromatic media such as n-octane, cyclohexane, methylene chloride, trichloroethylene, carbon tetrachloride, dibutyl ether, dioxane, tetrahydrofuran, dimethylformamide, ethanol, butanol, acetone, diethylketone, acetonitrile, benzene, chlorobenzene, toluene, xylene, mesitylene, and the like. Water or a mixture of water with a miscible organic solvent also can be utilized when the aqueous medium is compatible with the dye component of the solution.

THEORY AND PRACTICE OF LASER DYE SYSTEMS

The most important advantage of a dye laser is that the optical output is tunable over a wide frequency range. Because it is tunable, a dye laser is suitable for many applications such as spectroscopy, molecular dissociation, chemical reactions, and isotope separation.

As described in the "Dye Laser" text disclosed above, the dye component of the solution medium in a dye laser is excited by an external source of short-wavelength light, and it emits radiation at longer wavelengths (i.e., it fluoresces). The dye fluoresces over a broad band of visible frequencies.

The dye molecule has two groups of states, i.e. the singlet states ($S_0$ $S_1$, and $S_2$) and the triplet states ($T_1$ and $T_2$). The singlet states occur when the total spin of the excited electrons in each molecule is equal to zero. The triplet states occur when the total spin is unity. Singlet-triplet and triplet-singlet transitions are far less likely than transitions between two singlet or between two triplet states.

The dye laser is pumped by the absorption of photons, which excite the molecules from the ground state $S_0$ to the first excited state $S_1$. There is a very rapid decay by a nonradiative process to the lowest energy states of $S_1$. The laser transition occurs between a state near the bottom of $S_1$ and an intermediate state in $S_0$. Since there are many vibrational-rotational sublevels within $S_0$ and $S_1$, the resulting emission line is very broad. The triplet states $T_1$ and $T_2$ are not involved directly in the laser action, but they have a pronounced effect. There is a small probability that the forbidden transition $S_1 \rightarrow T_1$ (called an intersystem crossing) will occur. Since transition $T_1 \rightarrow S_0$ (phosphorescence) is also forbidden, the molecules tend to pile up in the $T_1$ state. But the transition $T_1 \rightarrow T_2$ is allowed and it is a disadvantage that the range of frequencies for that transition coincides almost exactly with the range of laser transition frequencies. Once a significant fraction of the molecules have made the $S_1 \rightarrow T_1$ transition, the $T_1 \rightarrow T_2$ absorption quickly reduces the laser gain and can quench laser action. For this reason, conventional dye lasers operate on a pulsed basis with pulse durations shorter than the time that it takes for the population of the $T_1$ state to reach a significant value.

The broad tuning range made available by using different dyes as active media enables coverage of almost the entire visible range of wavelengths. Rhodamine 6G is specified in many dye laser systems because of its high efficiency (about 20 percent) and its broad tuning range. All dye lasers are optically pumped, and the primary requirement is that the pump light source has an output near the peak of the dye absorption band. By the nature of the dye, the laser output occurs at wavelengths longer than that of the excitation source. Rhodamine 6G, which fluoresces around 590 nm, is pumped by light in the 490–515 nm (blue-green) region of the spectrum. For a dye fluorescing in the deep blue, a pump source with ultraviolet output is required.

The type of pump source dictates not only the laser output range, but also the specific pumping configuration to be used. The first and simplest method of pumping a dye is to treat it as if it were a solid-state crystal rod that is being optically pumped. In a conventional dye laser, a tube containing flowing dye is placed in an elliptical reflector and pumped by a linear flashlamp. Flashlamp pumping yields peak power of several kilowatts and average powers on the order of 50 mW in the visible region.

It is also possible to pump dyes using a nitrogen laser as a source. The dye is optically pumped in a transverse geometry, with the fan-shaped beam from the pump laser focused into a region along one side of the dye cell. The output windows on the ends of the cell may be either flat and antireflection-coated or tilted at the Brewster angle. The mirrors are external to the dye cell, so that a change of tuning range involves only a change of dye cell and a reorientation of frequency-selective devices located in the laser cavity. Because of the short wavelength of the nitrogen laser and its high peak power, dye-laser output can be achieved over a wide spectral region extending from 350–680 nm. The output pulse energy of a typical nitrogen laser is about one millijoule (100 kW peak for 10 nsec). The pumped dye laser output for these excitation levels varies between 2–200 microjoules.

Another widely used pumping source for a dye laser is the powerful blue-green lines or the ultraviolet lines of an argon ion laser. For many dyes that lase at wavelengths greater than 560 nm (yellow through red), the dye absorption bands cover the visible output of the argon laser. A dye, such as rhodamine 6G, can absorb nearly all of the visible output and convert more than 20 percent of the input energy into coherent output at the peak of its emission band.

Because of the extremely high small-signal gain of most laser dyes, only a small amount of active dye component is needed. However, the intense absorption and subsequent heating of the small volume of dye plus the rapid buildup of the triplet-state population in a conventional dye laser necessitates a continuous and rapid change of the pumped volume. Failure to do so produces a heated dye that decomposes, resulting in increased absorptive losses for the system.

Tuning the laser output is accomplished by means of a wavelength-dispersing element such as a prism wavelength selector. In some cases a multiple Brewster prism configuration can be used for increased dispersion. In other cases, the gain of the dye is so high that a diffraction grating can serve as a combined end mirror and dispersive element.

For a grating with a normal set at an angle $\theta$ to the optic axis of the laser, a very narrow band of wavelengths satisfying the relationship $m\lambda = 2d \sin \theta$,
m is an integer are diffracted back down the laser cavity. The grating order m is usually unity, and d is the distance between rulings of the grating. Other wavelengths are not returned to the cavity and experience high loss. The wavelength can be changed by merely rotating the grating to change the angle $\theta$.

There are a number of other tuning elements that can be inserted into the dye laser cavity. One type used in commercial devices is a wedge filter. This filter consists of a substrate with three dielectric coatings. The first and third coatings form highly reflective mirrors; the middle coating is a wedge of dielectric material that provides a variable mirror separation. Together the coatings form a variable-width Fabry-Perot interferometer. By moving the wedge in a direction perpendicular to the cavity axis, the peak transmission of the filter is tuned to a different wavelength. The reduced loss at the new wavelength admits stimulated emission there.

Another device that can be used to tune a dye laser is a birefringent filter consisting of several quartz waveplates of different thicknesses. These plates are placed in the laser cavity at the Brewster angle such that the vertically polarized light in the cavity experiences no loss by reflection at the plate surfaces. The no-loss condition permits amplification of light in the cavity with a high degree of linear polarization. The crystal axes of a quartz wave plate are oriented such that the plate behaves as a full waveplate for vertically polarized light if $\lambda_0$, the wavelengths in a vacuum, satisfies the relation $d(\eta_{slow} - \eta_{fast}) = m\lambda_0$ (m is an integer), where d is the distance traveled by the light in the plate. For other wavelengths, transmission of the vertically polarized light through the plate results in elliptical polarization. After reflection at an end mirror, this elliptically polarized light experiences loss by reflection at the next encounter with the waveplate surface. This loss prevents lasing at wavelengths that differ much from those satisfying the full-wave condition. Although a single thin plate can isolate one band within the lasing region, the resulting linewidth is approximately 0.3 nm, a value somewhat large for most applications. However, if a second waveplate twice the thickness of the first is also placed in the cavity, the linewidth is reduced to 0.1 nm. For some applications, a third plate twice the thickness of the second is inserted to further reduce the linewidth to less than 0.03 nm. Tuning the laser is accomplished by rotating the plates, which are mounted on a common stage, about the normal to the plate surfaces.

As indicated in the above description of lasing systems, conventional dye lasers have disadvantages which limit their potential applications.

A present invention dye laser device has novel design aspects which eliminate several limitations characteristic of conventional dye lasers systems.

First, a present invention dye laser utilizes a static volume of dye solution, thereby dispensing with the dye solution pumping means of conventional dye lasers.

Second, a present invention dye laser solution is sealed within a porous glass matrix, and is protected from contact with moisture and oxygen.

Third, during operation of a present invention dye laser, collision of the excited dye molecules with the internal pore surfaces dissipates the triplet-state energy by enhancing the transition of triplet state molecules to the ground state, thereby preventing a buildup of the triplet-state population of molecules.

Fourth, the internal inorganic glass matrix of thin-walled pore surfaces functions as a heat absorber, thereby moderating any heat increase in the dye solution during operation.

Fifth, a present invention dye laser composite medium has the structural strength and other advantages of a solid matrix, while providing the superior lasing properties of a liquid phase dye solution.

A present invention dye laser device has a simpler design and can be operated with greater facility and efficiency as compared to a conventional dye laser system.

The following examples are further illustrative of the present invention. The components and specific ingredients are presented as being typical, and various modifications can be derived in view of the foregoing disclosure within the scope of the invention.

EXAMPLE I

This Example illustrates the preparation of microporous glass monoliths.

A first solution is prepared by admixing 19.82 grams (0.22 mole) of 1,3,5-trioxane, 208.33 grams (1.0 mole) of tetraethoxysilane (TEOS) and 189.35 grams (4.11 moles) of ethanol in a 600 cc polymethylpentene beaker.

A second solution is prepared in a polymethylpentene beaker by diluting 0.95 gram of 40% aqueous HF (0.019 mole HF) with 75.64 grams of water (a total of 4.23 moles of water are present).

The second solution is added to the first solution over a period of about two minutes with vigorous stirring. The blended mixture is stirred at room temperature for a period of about one hour.

The reaction solution is then distributed into 45 polystyrene test tubes (12 cc each) equipped with screw-on caps. The tightly capped samples are maintained at room temperature for 24 hours and then placed upright in an air oven at 50° C. for 24 hours. During the next two 24-hour periods, the caps are first loosened and then removed.

After heating the uncapped tube samples at 50° C. for 24 hours, the rod-shaped gels are transferred to ceramic containers, and placed in a high-temperature air-purged muffle furnace. The gels are then dried and processed according to the following temperature ramp schedule. The rate of temperature increase between treatment temperatures is controlled at approximately 10° C./min.

| TREATMENT TEMPERATURE (°C.) | DURATION PERIOD (hours) |
|---|---|
| 80 | 72 |
| 225 | 72 |
| 500 | 24 |
| 600 | 24 |
| 700 | 24 |
| 800 | 24 |
| 900 | 24 |

The furnace is cooled to 300° C. before removal of the microporous glass rod products. The rods are stored in a desiccator over dried 3 ÅA molecular sieves to prevent undesired water absorption. The microporous rods are transparent with no visible defects or "schlieren" in the bulk.

The glass rods have a pore volume of about 40–50%, an average pore diameter of about 50–60 angstroms, and a surface area of about 300 m$^2$ per cc.

EXAMPLE II

A porous glass rod (10 mm length × 6 mm diameter) of 50–60 angstroms average pore diameter is submerged for one hour in an ethanol solution of Rhodamine 6G (0.001M)

The impregnated glass rod is withdrawn from the solution and air dried to remove the ethanol solvent from the surface of the porous glass structure. The impregnated glass rod is transparent.

The glass rod is film coated with poly(methyl methacrylate) by dipping the glass rod which is filled with ethanol and Rhodamine 6G into a methyl ethyl ketone solution of poly(methyl methacrylate) and then air drying.

The two faces of the glass rod are polished to optical clarity. The rod then is mounted and aligned within the optical cavity of a lasing system, consisting of a continuous wave argon ion laser for optical pumping, a high reflectance (99–100% R) end mirror, a prism, and an output mirror (22–95% R). The prism is rotated so that the desired wavelength reaches the end mirror at normal incident, and then retraces its path in the optical cavity, and contributes to the lasing output.

The dye laser operates with greater than 10% pumping efficiency, and is tunable from 570–630 nm with continuous output. The dye laser can be operated continuously for a period of more than 50 hours without loss of pumping efficiency. There is no evidence of dye degradation due to heat build-up in the dye laser medium during operation.

What is claimed is:

1. A dye laser consisting of a composite composition of an inorganic oxide glass monolith with a microporous structure containing an incorporated solution comprising a solvent component and a lasable dye component, and wherein the glass monolith has sealed outer surfaces.

2. A dye laser in accordance with claim 1 wherein the inorganic oxide comprises silica, alumina, titania or zirconia.

3. A dye laser in accordance with claim 1 wherein the inorganic oxide comprises a mixture of silica and at least one additional inorganic oxide.

4. A dye laser in accordance with claim 1 wherein the glass monolith microporous structure has pore diameters in the range between about 15–2000 angstroms.

5. A dye laser in accordance with claim 1 wherein the glass monolith is produced by a sol gel process.

6. A dye laser in accordance with claim 1 wherein between about 80–100 percent of the glass monolith microporous structure volume is filled with the incorporated solution.

7. A dye laser in accordance with claim 1 wherein the dye concentration of the incorporated solution is between about $10^{-2}-10^{-4}$ molar.

8. A dye laser in accordance with claim 1 wherein the lasing dye is a cyanine compound.

9. A dye laser in accordance with claim 1 wherein the lasing dye is a xanthene compound.

10. A dye laser in accordance with claim 1 wherein the lasing dye is a triarylmethane compound.

11. A dye laser in accordance with claim 1 wherein the lasing dye is a acridine compound.

12. A dye laser in accordance with claim 1 wherein the lasing dye is a azine compound.

13. A dye laser in accordance with claim 1 wherein the lasing dye is a chlorophyll compound.

14. A dye laser in accordance with claim 1 wherein the lasing dye is a polyphenylene compound.

15. A dye laser in accordance with claim 1 wherein the lasing dye is a condensed aromatic ring compound.

16. A dye laser in accordance with claim 1 wherein the lasing dye is a coumarin compound.

17. A dye laser in accordance with claim 1 wherein the lasing dye is a oxazole compound.

18. A dye laser in accordance with claim 1 wherein the lasing dye is a phthalimide compound.

19. A dye laser in accordance with claim 1 wherein the lasing dye is a pteridine compound.

20. A dye laser in accordance with claim 1 wherein the outer surfaces of the glass monolith are sealed with an inorganic sealant.

21. A dye laser in accordance with claim 1 wherein the outer surfaces of the glass monolith are sealed with an organic sealant.

22. A tunable lasing system which comprises a laser cavity containing a laser dye medium, and an optical pumping excitation means coupled with the dye medium and producing stimulated emission of the dye medium; wherein the dye medium consists of a composite composition of an inorganic oxide glass monolith with a microporous structure containing an incorporated solution comprising a solvent component and a lasable dye component, and wherein the glass monolith has sealed outer surfaces.

23. A tunable lasing system in accordance with claim 22 which is operable with a pulsed or continuous optical pumping mode.

24. A tunable lasing system in accordance with claim 22 wherein the excitation means is an argon ion laser, and the dye is a rhodamine compound.

* * * * *